United States Patent [19]

Kondo et al.

[11] Patent Number: 5,703,993
[45] Date of Patent: Dec. 30, 1997

[54] RGB ENCODER FOR CONVERTING DIGITAL SIGNALS TO ANALOG SIGNALS AND ACTIVATING DEACTIVATING D/A CONVERTERS ACCORDING TO A MODE SIGNAL

[75] Inventors: Masahito Kondo; Kyoji Marumoto, both of Kyoto, Japan

[73] Assignee: Rohm Co., Ltd., Kyoto, Japan

[21] Appl. No.: 659,490

[22] Filed: Jun. 6, 1996

[30] Foreign Application Priority Data

Jun. 8, 1995 [JP] Japan .................. H7-141638

[51] Int. Cl.⁶ ..................... H04N 9/87; H04N 3/27
[52] U.S. Cl. ................ 386/35; 386/45; 348/554; 348/660; 348/372
[58] Field of Search ................ 358/310, 322, 358/334, 342; 348/554, 555, 557, 558, 659, 660, 661, 372, 705, 706, 70, 71, 604; 369/32; 386/1, 35, 44, 45, 82, 123, 124, 125, 126, 131

[56] References Cited

U.S. PATENT DOCUMENTS

| | | | |
|---|---|---|---|
| 4,951,134 | 8/1990 | Nakasima et al. | 348/71 |
| 5,164,824 | 11/1992 | Ieoka et al. | 348/71 |
| 5,227,870 | 7/1993 | Asada et al. | 348/256 |
| 5,327,156 | 7/1994 | Masukane et al. | 345/113 |
| 5,387,928 | 2/1995 | Nishimura | 348/70 |
| 5,389,949 | 2/1995 | Nakada et al. | 345/154 |
| 5,402,180 | 3/1995 | Jung | 348/642 |
| 5,438,434 | 8/1995 | Saitoh | 348/344 |
| 5,499,221 | 3/1996 | Ito et al. | 369/32 |
| 5,500,740 | 3/1996 | Muramoto | 358/327 |
| 5,543,835 | 8/1996 | Mumura | 348/71 |

*Primary Examiner*—Andrew Faile
*Assistant Examiner*—Aung S. Moe
*Attorney, Agent, or Firm*—Nikaido Marmelstein Murray & Oram LLP

[57] ABSTRACT

An encoder converts digital RGB signals into analog television signals. This encoder forms digital composite, luminance and chrominance signals based on digital signals input through an RGB input terminal. The encoder has a first, a second and a third D/A converters for converting digital composite, luminance and chrominance signals into corresponding analog signals. The encoder is provided with a switch for activating required ones of the three D/A converters and deactivating others of the D/A converters.

8 Claims, 5 Drawing Sheets

RGB ENCODER FOR CONVERTING DIGITAL SIGNALS TO ANALOG SIGNALS AND ACTIVATING DEACTIVATING D/A CONVERTERS ACCORDING TO A MODE SIGNAL

BACKGROUND OF THE INVENTION

1. Field of the Invention

The present invention relates to an RGB encoder such as is used in a so-called video-CD player or a digital video disc (DVD) player.

2. Description of the Prior Art

An RGB encoder converts R, G and B digital signals into digital luminance, composite and chrominance signals.

In addition, the RGB encoder converts those luminance, composite and chrominance signals into analog values, and outputs the analog luminance, composite and chrominance signals.

A conventional RGB encoder is so constructed as to activate all the three D/A converters for converting digital luminance, composite and chrominance signals into analog values.

Such conventional RGB encoder will not cause a problem in appliances such as a video-CD player or a DVD player of a stay-at-home type, because such appliances are supplied with power from a commercial power line. In portable type appliances, however, since they are supplied with power of a battery, a conventional RGB encoder is defective because no consideration is given to reduction of power consumption.

More specifically, a monitor such as a television set or a liquid crystal display unit works either using only a composite signal or using a luminance signal together with a chrominance signal. In other words, the monitor does not need all of composite, luminance and chrominance signals simultaneously. Therefore, constant output of all these three signals is a waste, leading the encoder to consume more power than necessary.

SUMMARY OF THE INVENTION

An object of the present invention is to provide an RGB encoder which can save power by adapting its power consumption to a condition under which the encoder is used, and to provide an electronic appliance incorporating such an RGB encoder.

To achieve the above object, an encoder of the present invention is provided with RGB input terminals; a circuit for forming digital composite, luminance and chrominance signals based on R, G and B digital signals input through the RGB input terminals; first, second and third D/A converters for converting the digital composite, luminance and chrominance signals into corresponding analog signals; first, second and third output terminals for outputting analog-converted composite, luminance and chrominance signals, respectively; a mode terminal for inputting a mode signal; a selecting circuit for activating required ones of the three D/A converters and deactivating others according to said mode signal.

According to the construction described above, since only selected ones of the three D/A converters are turned on while the other D/A converters are turned off according to the mode signal, the D/A converters that are turned off do not consume power. This leads to reduction of power consumption in the encoder as a whole, and consequently, contributes to saving of battery power, when the encoder is employed in a portable type appliance.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
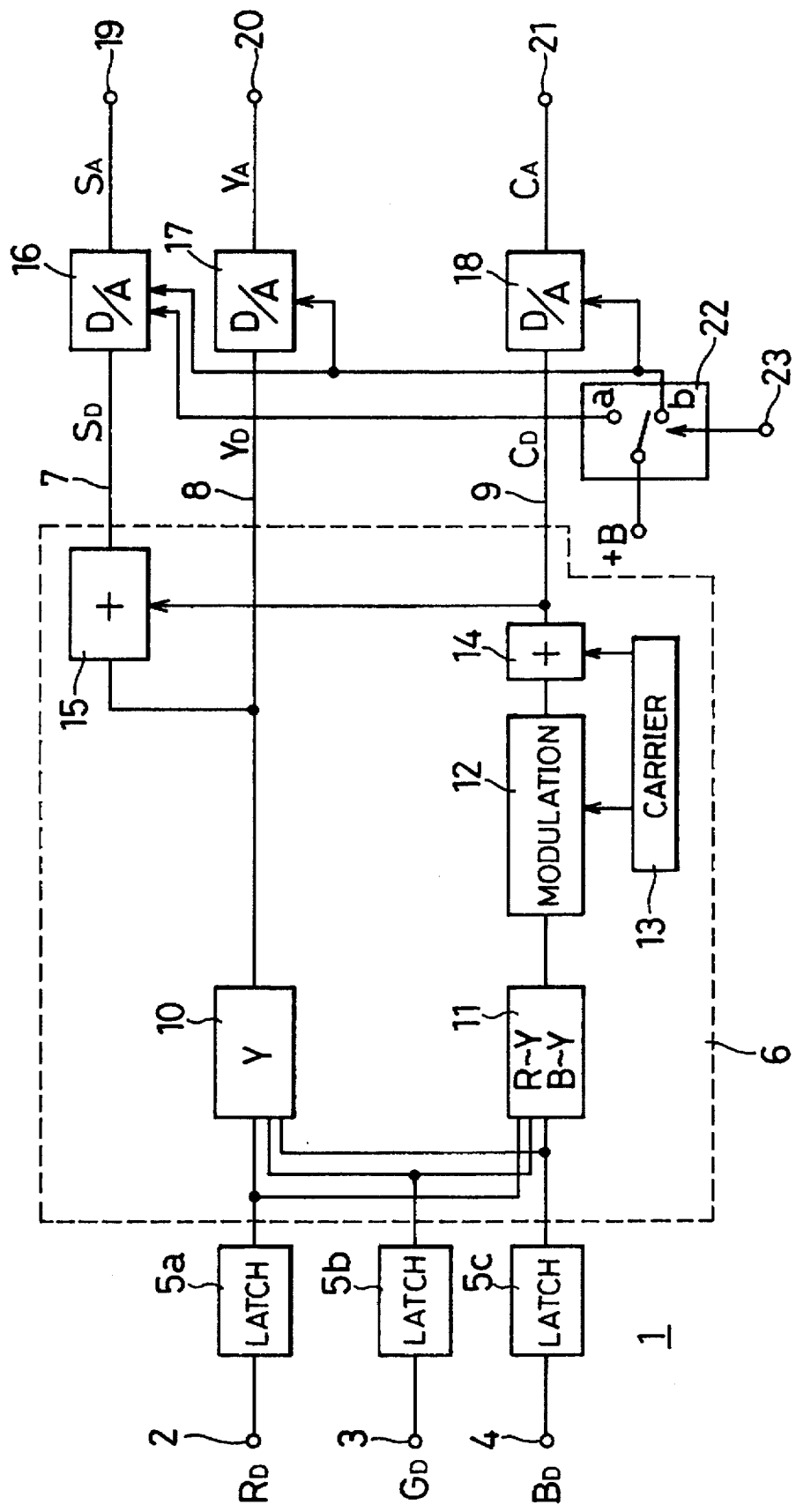
FIG. 1 is a block diagram showing an RGB encoder embodying the present invention.
Figure 9:
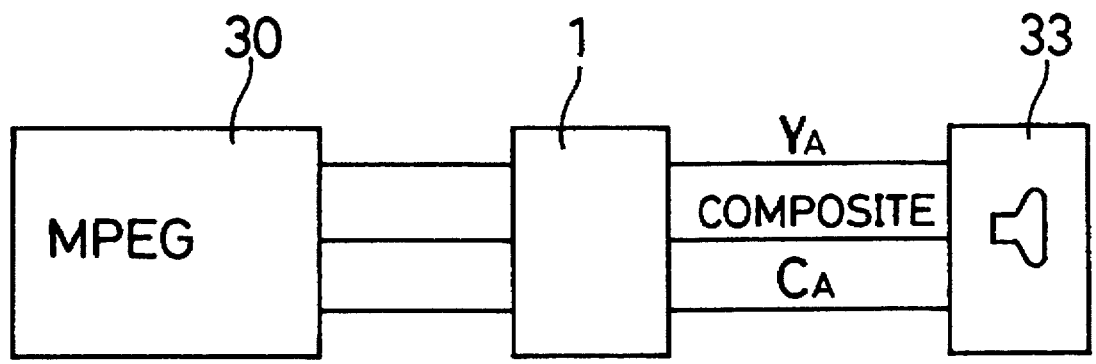
FIG. 9 is a block diagram for explaining the manner of use of an RGB encoder of the present invention.

FIG. 1 shows an RGB encoder 1 formed as a one-chip IC. Reference numerals 2, 3 and 4 represent input terminals for inputting R, G and B digital signals. These terminals are connected to an MPEG core chip 30 to receive digital R, G and B signals as shown in FIG. 9, for example. Reference numerals 5a, 5b and 5c represent latch circuits, for latching and outputting the input R, G and B signals $R_D$, $G_D$ and $B_D$.

Reference numeral 6 is a circuit for processing the input R, G and B digital signals $R_D$, $G_D$ and $B_D$ and outputting television signals other than R, G and B signals. This circuit 6 outputs a digital composite signal ($S_D$) to a signal path 7, a digital luminance signal ($Y_D$) to a signal path 8, and a digital chrominance signal ($C_D$) to a signal path 9.

Reference numeral 10 represents a luminance signal forming circuit for forming a digital luminance signal ($Y_D$) based on the digital R, G and B signals $R_D$, $G_D$ and $B_D$. Reference numeral 11 represents a color-difference signal forming circuit for forming digital color-difference signals B–Y and R–Y based on the digital R, G and B signals $R_D$, $G_D$ and $B_D$. In a modulation circuit 12, outputs from the color-difference signal forming circuit 11 modulates a carrier supplied by a color carrier generating circuit 13. In an adder circuit 14, a color carrier is inserted as color burst signals at color burst positions of the modulated signal obtained from the modulation circuit 12.

Reference numeral 15 is an adder circuit for adding the luminance signal ($Y_D$) and the chrominance signal ($C_D$), and for outputting a resultant signal as a composite signal ($S_D$). Reference numerals 16, 17 and 18 represent a first, a second and a third D/A converters for converting the input digital composite signal ($S_D$), luminance signal ($Y_D$) and chrominance signal ($C_D$) into analog composite signal ($S_A$), luminance signal ($Y_A$) and chrominance signal ($C_A$), and for outputting thus converted signals.

Reference numerals 19, 20 and 21 are output terminals for outputting outputs from the D/A converters 16, 17 and 18. These terminals are connected to a television monitor 33, if necessary, as shown in FIG. 9. Reference numeral 22 represents a switch for switching on and off a power supply +B. The switch 22 is switched between a terminal (a) position and a terminal (b) position depending on a mode signal fed from a mode terminal 23. The switch 22 is formed as a semiconductor switch.

Figure 2:
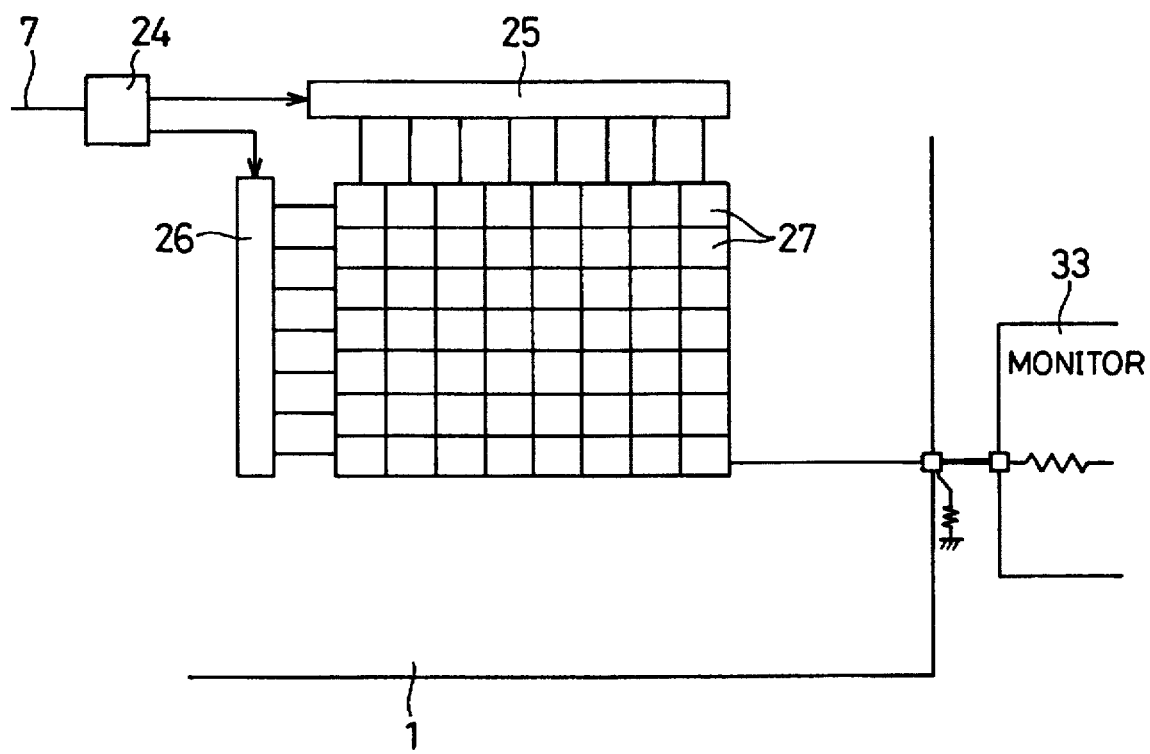
FIG. 2 is a diagram showing the outline of the D/A converter of the present invention.

FIG. 2 shows an example of the D/A converter 16 as representing said D/A converters 16, 17 and 18. In the figure, reference numeral 24 is a signal processing circuit, reference numeral 25 represents a horizontal drive circuit, reference numeral 26 represents a vertical drive circuit. Reference numeral 27 represents cells arranged in a matrix.

Figure 3:
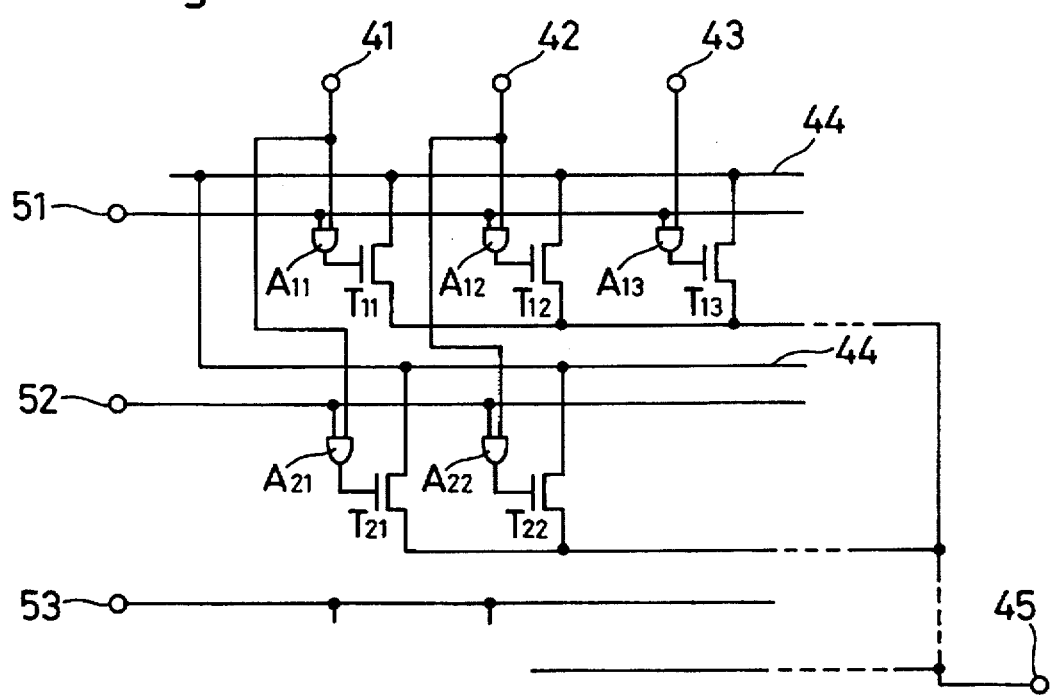
FIG. 3 is a circuit diagram showing details of cells in the D/A converter of the present invention.

FIG. 3 shows details of five cells extracted from the cells 27. Here $T_{11}$, $T_{12}$, $T_{13}$, $T_{21}$ and $T_{22}$ represent transistors that form cells. Reference numerals 41, 42 and 43 are terminals for receiving drive signals from the horizontal drive circuit 25. Reference numerals 51, 52 and 53 are terminals for receiving drive signals from the vertical drive circuit 26.

$A_{11}$, $A_{12}$, $A_{13}$, $A_{21}$ and $A_{22}$ represent AND gates. Reference numeral 44 represents a power line. The power line 44 is deactivated when it is not supplied with +B from the switch 22, and it is activated when it is supplied with +B from the switch 22.

Assume now that the terminal 41 is given a high level and the terminal 51 is given a high level. In this case, the AND gate $A_{11}$ outputs "1", turning on the transistor $T_{11}$. As a result, a current flows from the power line 44 to an output line 45. Levels ("1" and "0") at the terminals 41, 42, 43, 51, 52 and 53 are determined depending on how large the input signal is, and each transistor is turned on or off according to the levels at those terminals. As more transistors are turned on, the output current increases. A current in the output line is converted into a voltage as necessary.

Figure 5:
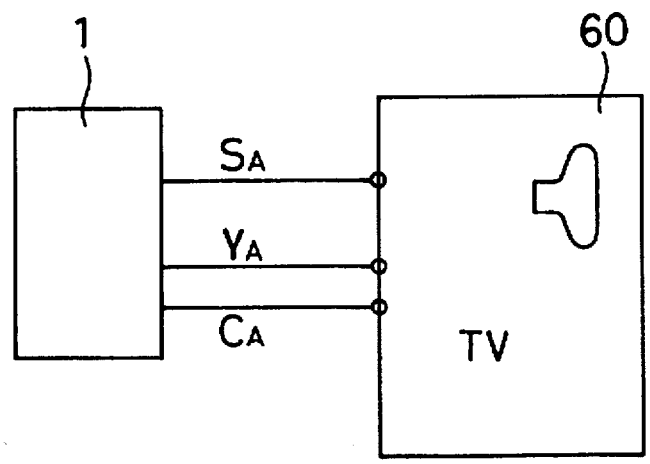
FIG. 5 is a diagram showing a manner of use of an RGB encoder of the present invention.

In a situation where the outputs of the encoder 1 of this embodiment are connected to a stay-at-home type television monitor 60 as shown in FIG. 5, the encoder 1 will most probably be incorporated in a stay-at-home type video-CD player or DVD player, being fed with power from a commercial power line. In a case like this, the mode terminal 23 is given a high level, and the switch 22 is switched to the terminal (b) position. Thus, all the D/A converters 16, 17 and 18 are activated, and accordingly, all of the composite signal ($S_A$), the luminance signal ($Y_A$) and the chrominance signal ($C_A$) are supplied to the television monitor 60. In such a case, the television monitor 60 should be so constructed, for example, as to preferably use the composite signal ($S_A$), neglecting the luminance signal ($Y_A$) and the chrominance signal ($C_A$).

Figure 6:
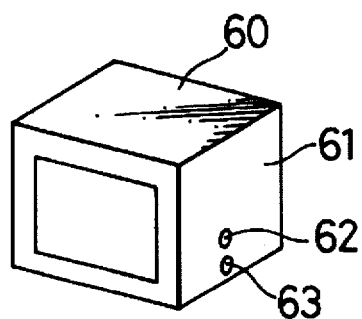
FIG. 6 is a perspective view of a television monitor.
Figure 7:
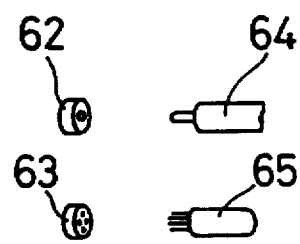
FIG. 7 is a diagram showing relationship between the video terminals of the television monitor and the connectors.

FIG. 6 is a perspective view of a television monitor 60, which has on its side a terminal 62 for the composite signal and a terminal 63 for the luminance signal and the chrominance signal. FIG. 7 shows these terminals 62 and 63, and connectors 64 and 65 connected thereto. The connectors 64 and 65 are attached to the ends of cables or the like, of which the other ends are connected to the encoder 1 or an appliance which includes such an encoder.

Figure 8:
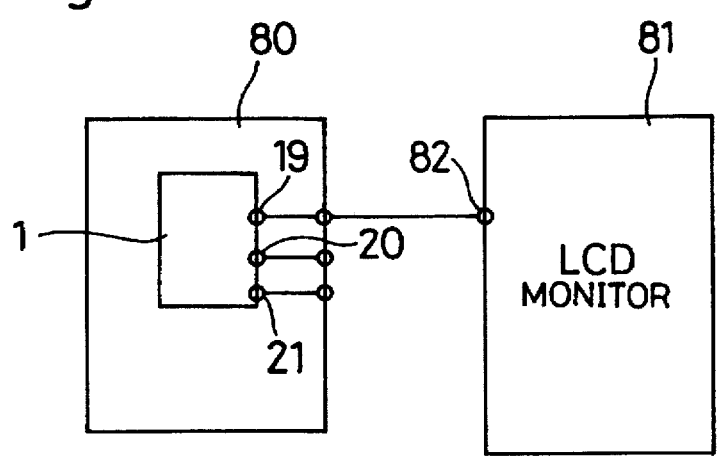
FIG. 8 is a diagram showing another manner of use of an RGB encoder of the present invention.

In contrast, in a situation where the encoder 1 is incorporated in a portable type appliance (video-CD player or DVD player) 80 as shown in FIG. 8, the appliance may be connected to a liquid crystal display monitor 81. In this case, the liquid crystal display monitor 81 has only a terminal 82 for the composite signal.

Accordingly, as to the D/A converters in the encoder 1, only the D/A converter 16 needs to be activated, while the D/A converters 17 and 18 are left deactivated. To achieve this, the mode terminal 23 is given a low level, and the switch 22 is switched to the terminal (a) position. Thus, it is possible to save power consumed in the encoder 1.

Incidentally, each of the D/A converters 16, 17 and 18 requires a current of approximately 30 mA, and the other portions of the encoder require a current of approximately 30 mA in total.

Therefore, since a D/A converter consumes considerable power, it is meaningful to deactivate D/A converters which are not in use, especially in a portable type appliance. It is to be noted that, in FIG. 8, the liquid crystal display 81 is incorporated into the appliance 80.

Figure 4:
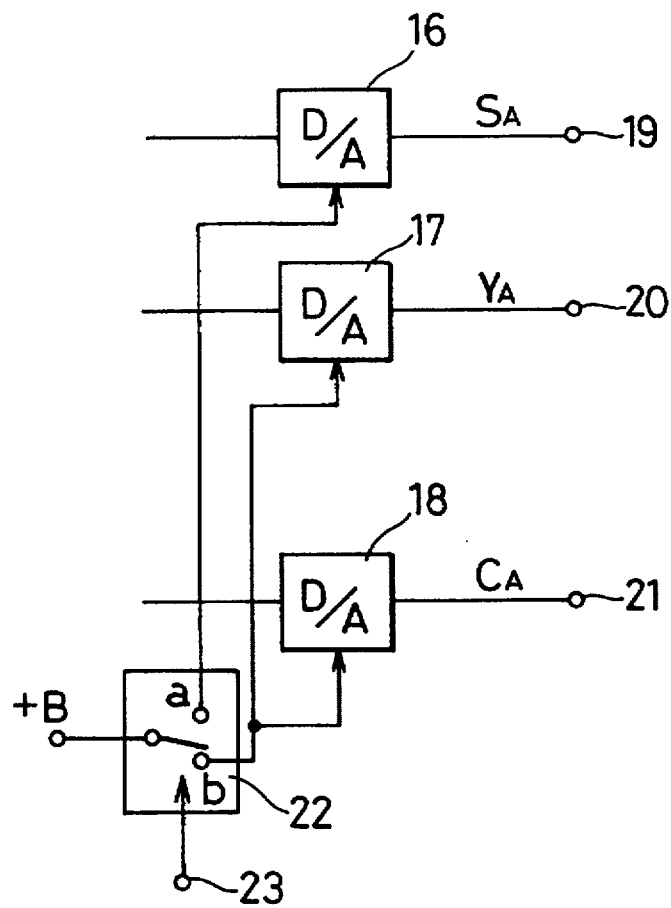
FIG. 4 is a circuit diagram showing the construction of the D/A converter selecting portion of another embodiment.

Selection of the D/A converters 16, 17 and 18 by the switch 22 may also be performed as shown in FIG. 4. There, the terminal (a) of the switch 22 is connected to the first D/A converter 16, and the terminal (b) is connected to the second and the third D/A converters 17 and 18. Such connection provides two modes: a mode in which the composite signal ($S_A$) is output, and a mode in which the luminance signal ($Y_A$) and the chrominance signal ($C_A$) are output. Although the description above of this embodiment assumes use of current-matrix type D/A converters, typical D/A converters of other types can be used instead.

As described above, according to the present invention, it is possible to save power, because the power consumed by an encoder can be adapted to a condition under which the encoder is used, and this is effective especially when the encoder is used in a portable type appliance.

What is claimed is:

1. An encoder for converting digital RGB signals into analog television signals, comprising;

RGB input terminals;

a circuit for forming digital composite, luminance and chrominance signals based on R, G and B digital signals input through said RGB input terminals;

a first, a second and a third D/A converters for converting said digital composite, luminance and chrominance signals into corresponding analog signals;

a first, a second and a third output terminals for outputting an analog-converted composite, luminance and chrominance signals, respectively;

a mode terminal for inputting a mode signal; and a selecting circuit for activating required ones of said D/A converters and deactivating others of said D/A converter according to said mode signal.

2. An encoder as claimed in claim 1, wherein activating and deactivating of said D/A converters are performed by turning on and off power supplied to the D/A converters.

3. An encoder as claimed in claim 1, wherein a first mode or a second mode is alternatively established depending on said mode signal, the first mode being a mode in which all the D/A converters are activated, the second mode being a mode in which the first D/A converter for the composite signal is deactivated while the second D/A converter for the luminance signal and the third D/A converter for the chrominance signal are activated.

4. An encoder as claimed in claim 1, wherein a first mode or a second mode is alternatively established depending on said mode signal, the first mode being a mode in which only the first D/A converter for the composite signal is activated, the second mode being a mode in which only the second D/A converter for the luminance signal and the third D/A converter for the chrominance signal are activated.

5. An electronic appliance including an encoder for converting digital RGB signals into analog television signals, wherein said encoder comprises:
RGB input terminals;
a circuit for forming digital composite, luminance and chrominance signals based on R, G and B digital signals input through said RGB input terminals;
a first, a second and a third D/A converters for converting said digital composite, luminance and chrominance signals into corresponding analog signals;
a first, a second and a third output terminals for outputting an analog-converted composite, luminance and chrominance signals, respectively;
a mode terminal for inputting a mode signal; and
a selecting circuit for activating required ones of said D/A converters and deactivating others of said D/A converters according to said mode signal.

6. An electronic appliance as claimed in claim 5, which is of a portable type.

7. An electronic appliance as claimed in claim 6, wherein a display device for displaying output of the encoder is incorporated in the electronic appliance.

8. An electronic appliance as claimed in claim 7, which reproduces images recorded on the disk.

* * * * *